US009638957B2

(12) United States Patent
Yang et al.

(10) Patent No.: US 9,638,957 B2
(45) Date of Patent: May 2, 2017

(54) LIQUID CRYSTAL DISPLAY PROVIDED WITH VIEWING ANGLE COMPENSATION

(71) Applicant: BOE TECHNOLOGY GROUP CO., LTD., Beijing (CN)

(72) Inventors: Yafeng Yang, Beijing (CN); Guangkui Qin, Beijing (CN); Jiaoming Lu, Beijing (CN); Jaegeon You, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 201 days.

(21) Appl. No.: 13/703,560

(22) PCT Filed: Oct. 8, 2012

(86) PCT No.: PCT/CN2012/082590
§ 371 (c)(1),
(2) Date: Feb. 22, 2013

(87) PCT Pub. No.: WO2013/086890
PCT Pub. Date: Jun. 20, 2013

(65) Prior Publication Data
US 2014/0176879 A1 Jun. 26, 2014

(30) Foreign Application Priority Data

Dec. 15, 2011 (CN) .......................... 2011 1 0421008

(51) Int. Cl.
*G02F 1/13363* (2006.01)
*G02F 1/139* (2006.01)

(52) U.S. Cl.
CPC ........ *G02F 1/13363* (2013.01); *G02F 1/1393* (2013.01); *G02F 1/133634* (2013.01);
(Continued)

(58) Field of Classification Search
CPC ........... G02F 1/13363; G02F 1/133528; G02F 1/133634; G02F 2001/133638;
(Continued)

(56) References Cited

U.S. PATENT DOCUMENTS

| 2003/0231270 A1* | 12/2003 | Kume ................. H04N 9/3108 349/119 |
| 2006/0098139 A1 | 5/2006 | Shibazaki |
| 2010/0201924 A1* | 8/2010 | Wu ................... G02F 1/133555 349/102 |

FOREIGN PATENT DOCUMENTS

| CN | 1595247 A | 3/2005 |
| CN | 1726423 A | 1/2006 |

(Continued)

OTHER PUBLICATIONS

International Preliminary Report on Patentability Issued Jun. 17, 2014; Appln. No. PCT/CN2012/082590.
(Continued)

*Primary Examiner* — Paisley L Arendt
*Assistant Examiner* — Angela Davison
(74) *Attorney, Agent, or Firm* — Ladas & Parry LLP

(57) ABSTRACT

An embodiment of present invention discloses a liquid crystal display provided with viewing angle compensation. The liquid crystal display provided with viewing angle compensation comprises a liquid crystal cell in a vertical arrangement, upper and lower polarizer sheets, and further comprises the first biaxial compensation film provided between the liquid crystal cell and the lower polarizer sheet, the second biaxial compensation film provided between the liquid crystal cell and the upper polarizer sheet, and a monoaxial compensation film provided at the upside and/or downside of the liquid crystal cell. The embodiment of present invention may be applicable for the viewing angle compensation in wide viewing-angle techniques.

15 Claims, 12 Drawing Sheets

(52) U.S. Cl.
CPC ............ *G02F 2001/133638* (2013.01); *G02F 2413/03* (2013.01); *G02F 2413/04* (2013.01); *G02F 2413/06* (2013.01); *G02F 2413/12* (2013.01)

(58) Field of Classification Search
CPC ............. G02F 2413/02; G02F 2413/08; G02F 2413/04; G02F 2413/11; G02F 2413/12; G02F 2001/133541; G02F 1/1335; G02F 2413/10; G02F 1/1393; G02F 2413/03; G02F 2413/05; G02F 2413/06
USPC ......... 349/117–119, 96; 345/489.07, 489.13, 345/489.15, 489.16; 359/489.07, 489.13, 359/489.15, 489.16
See application file for complete search history.

(56) References Cited

FOREIGN PATENT DOCUMENTS

| | | |
|---|---|---|
| CN | 101441364 A | 5/2009 |
| CN | 102650761 A | 8/2012 |

OTHER PUBLICATIONS

International Search Report mailed Mar. 1, 2013; PCT/CN2012/082590.
First Chinese Office Action dated Aug. 20, 2013; Appln. No. 201110421008.1
Chinese Rejection Decision; Appln. No. 201110421008.1; Issued Apr. 16, 2014.

* cited by examiner

LIQUID CRYSTAL DISPLAY PROVIDED WITH VIEWING ANGLE COMPENSATION

TECHNICAL FIELD

Embodiments of present invention relate to a liquid crystal display provided with viewing angle compensation.

BACKGROUND

Due to characteristics such as compactness, low power consumption, no radiation and the like, liquid crystal displays (LCDs) have been prevailed in the flat panel display area. The major structure of the liquid crystal display is a liquid crystal cell, and the liquid crystal cell comprises an array substrate, a color filter substrate and liquid crystal held therebetween. The array substrate is provided with an upper polarizer sheet at the outer side thereof, and the color filter substrate is provided with a lower polarizer sheet at the outer side thereof.

Compared with traditional CRT displays, liquid crystal displays undergo severe light leakage in oblique view directions in a dark-state and have relatively low contrast, which causes serious viewing angle problem to the liquid crystal displays. Namely, a person will watch different hues and even feel great aberration, when viewing shown images at different positions of a liquid crystal display, and when the oblique direction is reached a certain extent, the images will go out of sight.

It's common to solve this viewing angle problem by attaching an optical compensation film on the liquid crystal cell; however, the prior art solution is not always good for overcoming light leakage in the dark-state of a liquid crystal display and expanding the viewing angles of the liquid crystal display.

SUMMARY

Embodiments of the present invention intend to provide a liquid crystal display with viewing angle compensation, for resolving the light leakage problem in the dark-state of a liquid crystal display and expand the viewing angle of a liquid crystal display.

One aspect of the present invention discloses a liquid crystal display provided with viewing angle compensation, comprising: a liquid crystal cell in a vertical alignment mode; an upper polarizer sheet and a lower polarizer sheet, which are disposed on both sides of the liquid crystal cell respectively; a first biaxial compensation film provided between the liquid crystal cell and the lower polarizer sheet; a second biaxial compensation film provided between the liquid crystal cell and the upper polarizer sheet; and a monoaxial compensation film provided at the upside and/or downside of the liquid crystal cell.

For example, the monoaxial compensation film comprises a first monoaxial compensation film provided between the liquid crystal cell and the first biaxial compensation film and the second monoaxial compensation film provided between the liquid crystal cell and the second biaxial compensation film; retardation of the monoaxial compensation film is equal to half of liquid crystal retardation of the liquid crystal cell in a dark-state; a slow axis of the first biaxial compensation film is orthogonal to an absorption axis direction of the lower polarizer sheet, and a slow axis direction of the second biaxial compensation film is parallel to an absorption axis direction of the upper polarizer sheet.

For example, the monoaxial compensation film comprises a first monoaxial compensation film provided between the lower polarizer sheet and the first biaxial compensation film; retardation of the monoaxial compensation film is equal to liquid crystal retardation of the liquid crystal cell in a dark-state; a slow axis of the first biaxial compensation film is orthogonal to an absorption axis direction of the lower polarizer sheet, and a slow axis direction of the second biaxial compensation film is parallel to an absorption axis direction of the upper polarizer sheet.

For example, the monoaxial compensation film comprises a second monoaxial compensation film provided between the liquid crystal cell and the second biaxial compensation film; retardation of the monoaxial compensation film is equal to liquid crystal retardation of the liquid crystal cell in a dark-state; a slow axis of the first biaxial compensation film is orthogonal to an absorption axis direction of the lower polarizer sheet, and a slow axis direction of the second biaxial compensation film is parallel to an absorption axis direction of the upper polarizer sheet.

For example, the monoaxial compensation film comprises a first monoaxial compensation film provided between the liquid crystal cell and the first biaxial compensation film and a second monoaxial compensation film provided between the liquid crystal cell and the second biaxial compensation film; retardation of the monoaxial compensation film is equal to half of liquid crystal retardation of the liquid crystal cell in a dark-state; a slow axis direction of the first biaxial compensation film is parallel to an absorption axis direction of the lower polarizer sheet, and a slow axis direction of the second biaxial compensation film is orthogonal to an absorption axis direction of the upper polarizer sheet.

For example, the monoaxial compensation film comprises a first monoaxial compensation film provided between the liquid crystal cell and the first biaxial compensation film and a second monoaxial compensation film provided between the liquid crystal cell and the second biaxial compensation film; retardation of the monoaxial compensation film is equal to half of liquid crystal retardation of the liquid crystal cell in a dark-state; a slow axis direction of the first biaxial compensation film is parallel to an absorption axis direction of the lower polarizer sheet, and a slow axis direction of the second biaxial compensation film is parallel to an absorption axis direction of the upper polarizer sheet.

For example, the monoaxial compensation film comprises a first monoaxial compensation film provided between the liquid crystal cell and the first biaxial compensation film and a second monoaxial compensation film provided between the liquid crystal cell and the second biaxial compensation film; retardation of the monoaxial compensation film is equal to half of liquid crystal retardation of the liquid crystal cell in a dark-state; a slow axis direction of the first biaxial compensation film is orthogonal to an absorption axis direction of the lower polarizer sheet, and a slow axis direction of the second biaxial compensation film is orthogonal to an absorption axis direction of the upper polarizer sheet.

For example, the monoaxial compensation film comprises a second monoaxial compensation film provided between the liquid crystal cell and the second biaxial compensation film; retardation of the monoaxial compensation film is equal to liquid crystal retardation of the liquid crystal cell in a dark-state; a slow axis direction of the first biaxial compensation film is orthogonal to an absorption axis direction of the lower polarizer sheet, and a slow axis direction of the second biaxial compensation film is orthogonal to an absorption axis direction of the upper polarizer sheet.

For example, the monoaxial compensation film comprises a first monoaxial compensation film provided between the liquid crystal cell and the first biaxial compensation film; retardation of the monoaxial compensation film is equal to liquid crystal retardation of the liquid crystal cell in a dark-state; a slow axis direction of the first biaxial compensation film is orthogonal to an absorption axis direction of the lower polarizer sheet, and a slow axis direction of the second biaxial compensation film is orthogonal to an absorption axis direction of the upper polarizer sheet.

For example, the monoaxial compensation film comprises a first monoaxial compensation film provided between the liquid crystal cell and the first biaxial compensation film; retardation of the monoaxial compensation film is equal to liquid crystal retardation of the liquid crystal cell in a dark-state; a slow axis direction of the first biaxial compensation film is parallel to an absorption axis direction of the lower polarizer sheet, and a slow axis direction of the second biaxial compensation film is orthogonal to an absorption axis direction of the upper polarizer sheet.

For example, the monoaxial compensation film comprises a second monoaxial compensation film provided between the liquid crystal cell and the second biaxial compensation film; retardation of the monoaxial compensation film is equal to liquid crystal retardation of the liquid crystal cell in a dark-state; a slow axis direction of the first biaxial compensation film is parallel to an absorption axis direction of the lower polarizer sheet, and a slow axis direction of the second biaxial compensation film is parallel to an absorption axis direction of the upper polarizer sheet.

For example, the monoaxial compensation film comprises a second monoaxial compensation film provided between the liquid crystal cell and the second biaxial compensation film; retardation of the monoaxial compensation film is equal to liquid crystal retardation of the liquid crystal cell in a dark-state; a slow axis direction of the first biaxial compensation film is parallel to an absorption axis direction of the lower polarizer sheet, and a slow axis direction of the second biaxial compensation film is orthogonal to an absorption axis direction of the upper polarizer sheet.

For example, the monoaxial compensation film comprises a first monoaxial compensation film provided between the liquid crystal cell and the first biaxial compensation film; retardation of the monoaxial compensation film is equal to liquid crystal retardation of the liquid crystal cell in a dark-state; a slow axis direction of the first biaxial compensation film is parallel to an absorption axis direction of the lower polarizer sheet, and a slow axis direction of the second biaxial compensation film is orthogonal to an absorption axis direction of the upper polarizer sheet.

For example, retardation of The first biaxial compensation film is $Ro=(nx-ny)\times d=\lambda/2$, and an aspect ratio value of the first biaxial compensation film is $Nz=(nx-ny)/(nx-nx)=0.25$;

Retardation of the second biaxial compensation film is $Ro=(nx-ny)\times d=\lambda/2$, and an aspect ratio value of the second biaxial compensation film is $Nz=(nx-ny)/(nx-nz)=0.75$; wherein nx and ny are refractive indexes in the normal direction of the biaxial compensation film, nz is the refractive index in the vertical direction of the biaxial compensation film, $\lambda$ is wavelength, d is a thickness of the biaxial compensation film.

In the technical solution of embodiments of the present invention, by providing a biaxial compensation films at each side of a liquid crystal cell and providing a monoaxial compensation film at both sides or only one side of the liquid crystal cell, the light leakage problem in a dark-state of the liquid crystal display can be overcome, and the viewing angle of the liquid crystal display can be expanded.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

The objects, solutions and advantages of the embodiments of present invention will be more apparent from the following clear and complete description about the embodiments of present invention in connection with embodiments and accompany drawings. Obviously, the described embodiments are merely part of the embodiments of the present invention, but not all the embodiments. Based on the described embodiments of present invention, all the other embodiments achieved by the ordinary skilled in this art without any creative work belong to the protective scope of the present invention.

An embodiment of the present invention provides a liquid crystal display with viewing angle compensation, for solving the light leakage problem in the dark-state of a liquid crystal display and expanding the viewing angles of the liquid crystal display.

The embodiment of present invention provides a liquid crystal display provided with viewing angle compensation, comprising: a liquid crystal cell, an upper polarizer sheet and a lower polarizer sheet arranged in a vertical alignment (VA) mode, and the upper polarizer sheet and the lower polarizer sheet are provided at the upper and lower sides respectively. The liquid crystal display further comprise: a first biaxial compensation film provided between the liquid crystal cell and the upper polarizer sheet, a second biaxial compensation film provided between the liquid crystal cell and the lower polarizer sheet, and a monoaxial compensation film provided at the upside and/or underside of the liquid crystal cells.

The first biaxial compensation film between the lower polarizer sheet and the liquid crystal cell satisfies $Nz=(nx-nz)/(nx-ny)=0.25$, and the second biaxial compensation film between the upper polarizer sheet and the liquid crystal cell satisfies $Nz=(nx-nz)/(nx-ny)=0.75$, wherein nx and ny are refractive indexes in the normal direction of the biaxial compensation film, nz is the refractive index in the vertical direction of the biaxial compensation film, $\lambda$ is wavelength, d is a thickness of the biaxial compensation film. The position of the monoaxial compensation film may be provided at both sides of the liquid crystal cell, or only at the upside or the underside. The slow axis of the biaxial compensation film is orthogonal or parallel to the direction of the absorption axis of the upper polarizer sheet or the lower polarizer sheet.

In the technical solutions of the present embodiment, by providing a biaxial compensation film at each side of the liquid crystal cell and providing a monoaxial compensation film at both sides or only one side of the liquid crystal cell, the light leakage problem in a dark-state of the liquid crystal display can be effectively overcome, and the viewing angle of the liquid crystal display can be expanded.

The technical solutions of the present invention will be described through specified embodiments.

Embodiment 1

Figure 1:
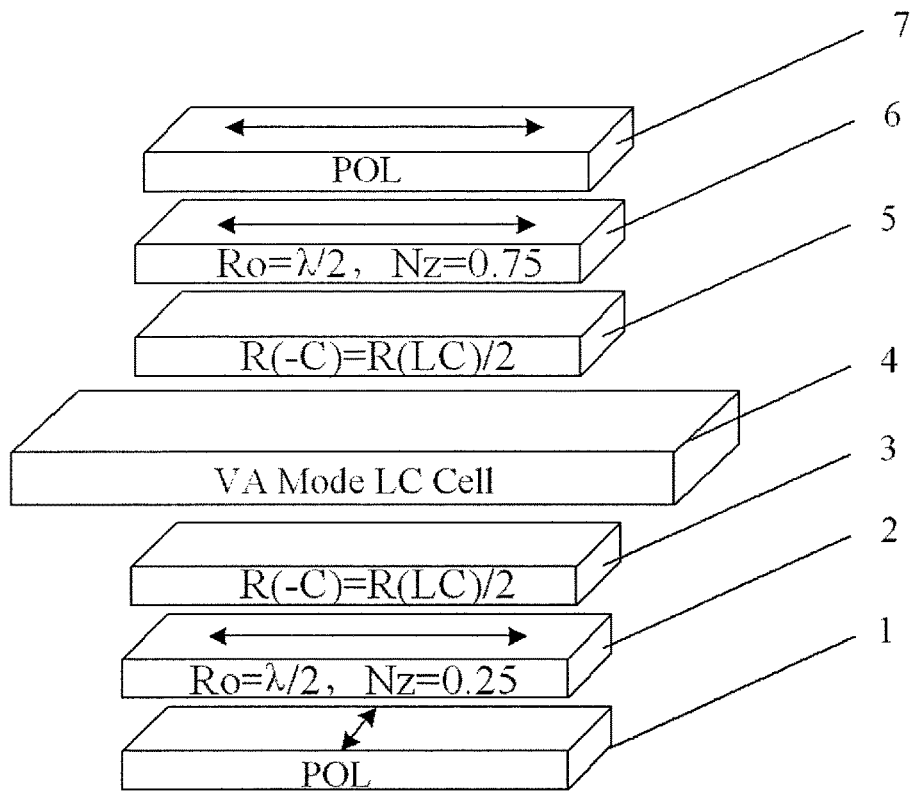
FIG. 1 is a structural schematic view of the liquid crystal display provided with viewing angle compensation according to embodiment 1 of the present invention.

As shown in FIG. 1, the compensation manner of this embodiment is to provide the monoaxial compensation films and the biaxial compensation films at both sides of the liquid crystal cell 4. Specifically, the liquid crystal display provided with viewing angle compensation of this embodiment from the bottom up sequentially comprises: a lower polarizer sheet 1, a first biaxial compensation film of nz=0.25, a first monoaxial compensation film 3, a liquid crystal cell 4 in a VA mode, a second monoaxial compensation film 5, a second biaxial compensation film 6 of Nz=0.75, and an upper polarizer sheet 7. The slow axis direction (as shown by the arrow in film 2 in the figure) of the first biaxial compensation film 2 is orthogonal to the absorption axis direction (as shown by the arrow in sheet 1 in the figure) of the lower polarizer sheet 1, and the slow axis direction (as shown by the arrow in film 6 in the FIGS.) of the second biaxial compensation film 6 is parallel to the absorption axis direction (as shown by the arrow in sheet 7 in the figure) of the upper polarizer sheet 7.

The first biaxial compensation film 2 at the lower polarizer sheet 1 has retardation of $Ro=(nx-ny)\times d=\lambda/2$, and the aspect ratio value thereof is $Nz=(nx-ny)/(nx-nz)=0.25$; the second biaxial compensation film 6 at the upper polarizer sheet 7 has retardation of $Ro=(nx-ny)\times d=\lambda/2$, and the aspect ratio value thereof is $Nz=(nx-ny)/(nx-nz)=0.75$. Both nx and ny are refractive indexes in the direction normal to the plane, nz is the refractive index in the vertical direction, d is a thickness of the film, and $\lambda$ is wavelength. The retardation R(−C) of the first monoaxial compensation film is half the liquid crystal retardation R(LC) in a dark-state of the liquid crystal cell 4, that is, R(−C)=R(LC)/2. Under the above situation, the range for the liquid crystal retardation is 80 nm<R(LC)<600 nm, and at the prerequisite condition of making the technology viable, the range for the liquid crystal retardation may be suitably expanded.

Figure 2:
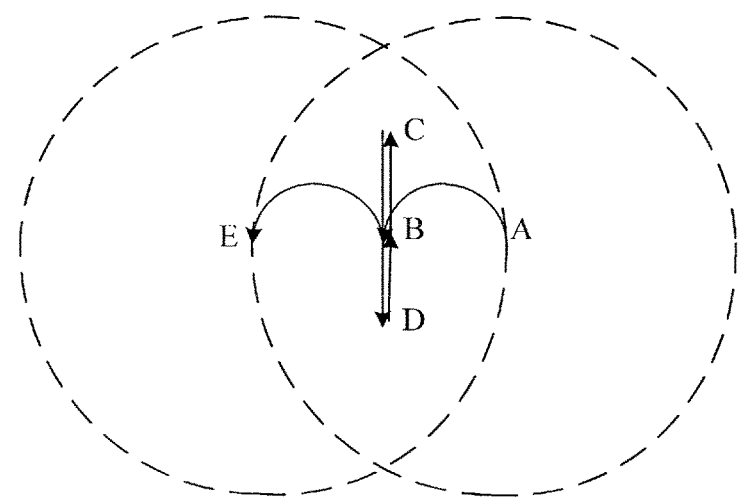
FIG. 2 is a compensation projection view on a Poincare sphere of the embodiment 1.

When being viewed obliquely in a dark-state, the light transmission of the lower polarizer sheet 1 cannot be fully absorbed by the upper polarizer sheet 7, since the absorption axis of the upper polarizer sheet 7 and the lower polarizer sheet 1 are no longer orthogonal to each other at the angle viewing; and further, when being viewed obliquely, the liquid crystal per se occurs light leakage effect. Hence, the configuration constituted with the upper polarizer sheet 7, the liquid crystal cell 4 and the lower polarizer sheet 4 needs to be compensated. FIG. 2 is a compensation projection view on a Poincare sphere of the embodiment 1. The compensation principle is described as follows with reference to FIGS. 1 and 2. When light transmits through the lower polarizer sheet 1, the polarization state is at point A, and the position of the absorption axis of the upper polarizer sheet is at point E, thus it's necessary for the polarization state to be shifted from point A to point E; when the light passes through the first biaxial compensation film 2 of Nz=0.25, according to phase differential $\Gamma=2\pi\delta nd/\lambda$, the retardation of the first biaxial compensation film 2 is $\delta nd=(nx-ny) d=\lambda/2$, thus the phase differential is $\pi$, and further, due to the slow axis direction of the first biaxial compensation film 2 of Nz=0.25 is orthogonal to the absorption axis direction of the lower polarizer sheet 1, the polarization state is shifted from point A to point B by a counterclockwise rotation of 180° around Nz=0.25; when the light passes through the first monoaxial compensation film 3, the polarization state occurs retardation from point B to point C; when the light passes through the liquid crystal cell 4, the liquid crystal retardation at the angle of oblique view causes the polarization state shift to point D; then, the polarization state comes back to point B from point D when the light passes further through the second monoaxial compensation film 5; thereafter, the polarization state is shifted from point B to point E by a counterclockwise rotation of 180° when the light is subject to the second biaxial compensation film 6 of Nz=0.75, and here compensation is achieved.

In the technical solutions of the present embodiment, by providing a biaxial compensation film at each side of the liquid crystal cell and providing monoaxial compensation films at both sides of the liquid crystal cell, the light leakage problem in a dark-state of the liquid crystal display is effectively overcome, and the viewing angle of the liquid crystal display is expanded.

Embodiment 2

Figure 3:
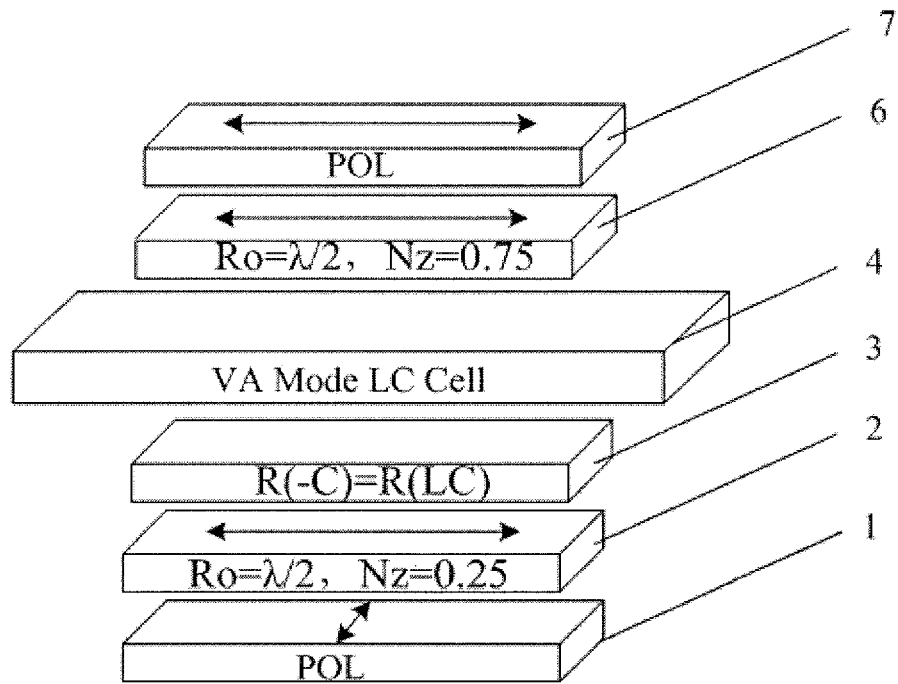
FIG. 3 is a structural schematic view of the liquid crystal display provided with viewing angle compensation according to embodiment 2 of the present invention.

As shown in FIG. 3, the liquid crystal display of this embodiment is substantially the same as that of embodiment 1 in structure, the difference is that a layer of monoaxial compensation film is provided only between the first biaxial compensation film 2 and the liquid crystal cell 4, that is, a first monoaxial compensation film 3, and the retardation R(-C) of the monoaxial compensation film is equal to the retardation R(LC) of liquid crystal when liquid crystal cell 4 is in the dark-state, that is, R(-C)=R(LC).

Figure 4:
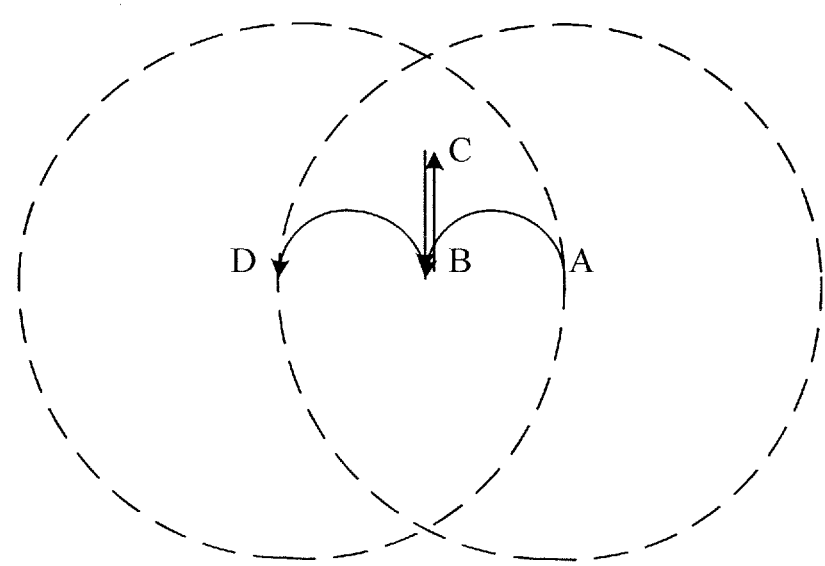
FIG. 4 is a compensation projection view on a Poincare sphere of the embodiment 2.

FIG. 4 is a compensation projection view on a Poincare sphere of the embodiment of the present invention. The compensation principle is described as follows with reference to FIGS. 3 and 4. When light transmits through the lower polarizer sheet 1, the polarization state is at point A, and the position of the absorption axis of the upper polarizer sheet is at point D, thus it's necessary for the polarization state to be shifted from point A to point D; when the light passes through the first biaxial compensation film 2 of Nz=0.25, according to phase differential $\Gamma=2\pi\delta nd/\lambda$, the phase differential is $\pi$ since the retardation $\delta nd=(nx-ny)d=\lambda/2$ of the first biaxial compensation film 2, and the polarization state is shifted from point A to point B by a counterclockwise rotation of 180° around Nz=0.25; when the light passes through the first monoaxial compensation film 3, the polarization state occurs retardation from point B to point C; when the light passes through the liquid crystal cello, the liquid crystal retardation at the angle of oblique view makes the polarization state return to point B; the polarization state is rotated from point B to point D by a counterclockwise rotation of 180° when the light is subject to the second biaxial compensation film 6 of Nz=0.75, and here compensation is achieved.

In the technical solutions of the present embodiment, by providing a biaxial compensation film at each side of the liquid crystal cell and providing a monoaxial compensation film at the underside of the liquid crystal cell, the light leakage problem in a dark-state of the liquid crystal display is effectively overcome, and the viewing angle of the liquid crystal display is expanded.

Embodiment 3

Figure 5:
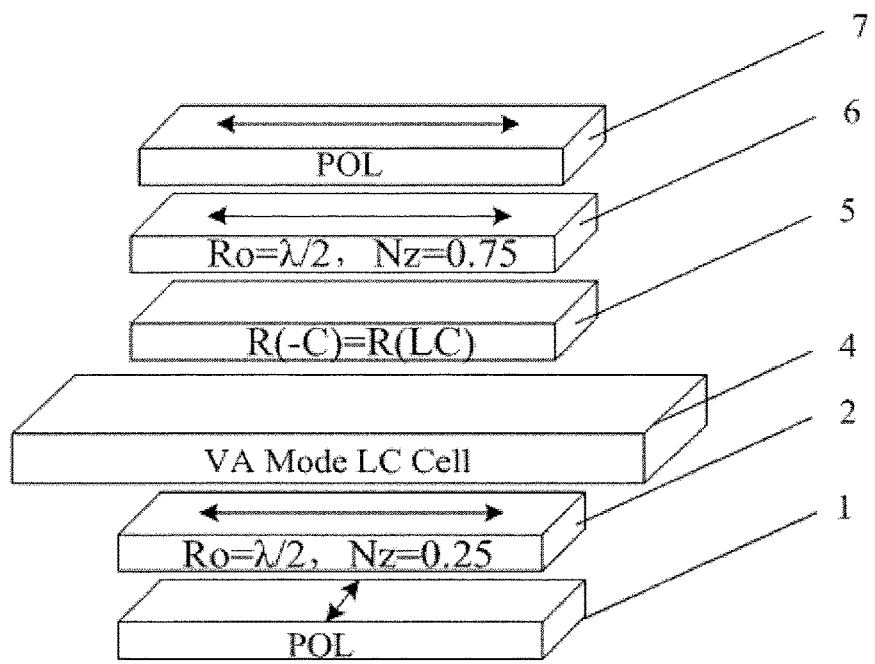
FIG. 5 is a structural schematic view of the liquid crystal display provided with viewing angle compensation according to embodiment 3 of the present invention.

As shown in FIG. 5, the liquid crystal display of this embodiment is substantially the same as that of embodiment 1 in structure, the difference is that a layer of monoaxial compensation film is provided only between the second biaxial compensation film 6 and the liquid crystal cell 4, that is, a second monoaxial compensation film 5, and the retardation R(-C) of the monoaxial compensation film is equal to the retardation R(LC) of liquid crystal when liquid crystal cell 4 is in the dark-state, that is, R(-C)=R(LC).

Figure 6:
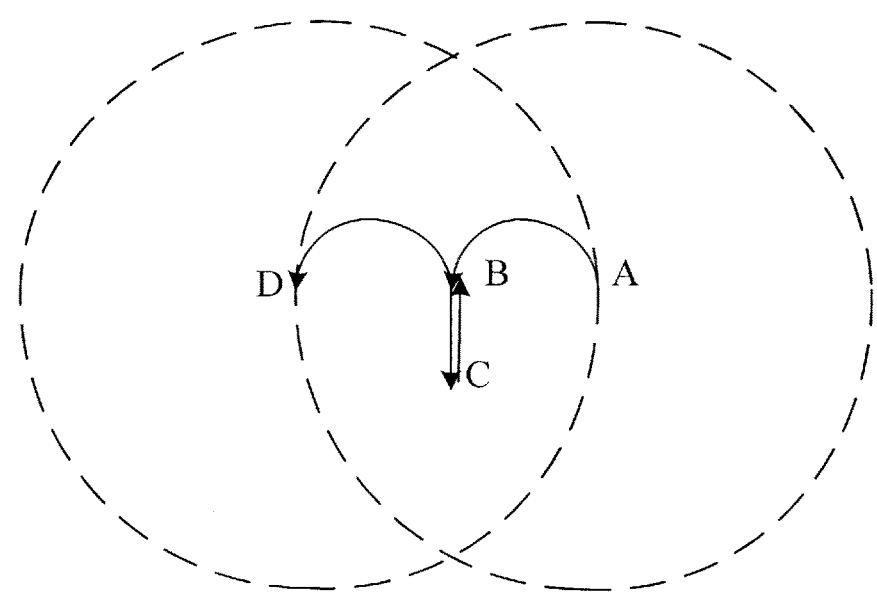
FIG. 6 is a compensation projection view on a Poincare sphere of the embodiment 3.

FIG. 6 is a compensation projection view on a Poincare sphere of the embodiment of the present invention. The compensation principle is described as follows with reference to FIGS. 5 and 6. When light transmits through the lower polarizer sheet 1, the polarization state is at point A, and the position of the absorption axis of the upper polarizer sheet is at point D, thus it's necessary for the polarization state to be shifted from Point A to Point D; when the light passes through the biaxial compensation film of Nz=0.25, according to phase differential $\Gamma=2\pi\delta nd/\lambda$, the phase differential is $\pi$ since the retardation $\delta nd=(nx-ny)d=\lambda/2$ of the first biaxial compensation film 2, and the polarization state is shifted from point A to point B by a counterclockwise rotation of 180° around Nz=0.25; when the light passes through the second monoaxial compensation film 5, the polarization state occurs retardation from point B to point C; when the light passes through the liquid crystal cell 4, the liquid crystal retardation at the angle of oblique view makes the polarization state return to point B; thereafter, the polarization state is shifted from point B to point D by a counterclockwise rotation of 180° when the light is subject to the biaxial compensation film of Nz=0.75, and here compensation is achieved.

In the technical solutions of the present embodiment, by providing a biaxial compensation film at each side of the liquid crystal cell and providing a monoaxial compensation film at the upside of the liquid crystal cell, the light leakage problem in a dark-state of the liquid crystal display is effectively overcome, and the viewing angle of the liquid crystal display is expanded.

Embodiment 4

Figure 7:
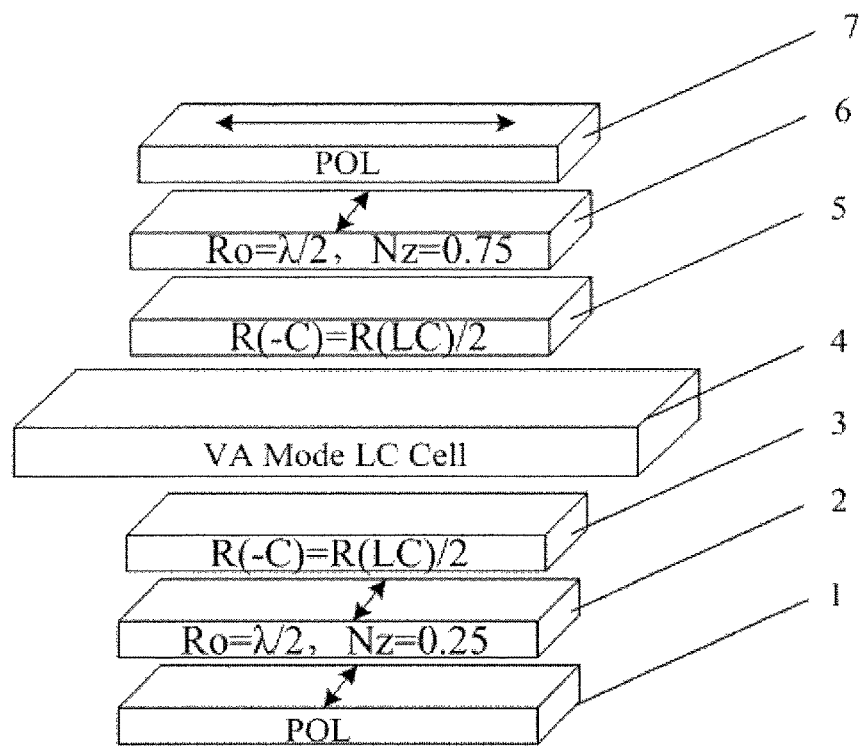
FIG. 7 is a structural schematic view of the liquid crystal display provided with viewing angle compensation according to embodiment 4 of the present invention.

As shown in FIG. 7, the liquid crystal display of this embodiment is substantially the same as that of embodiment 1 in structure, the difference is that, the slow axis direction of the first biaxial compensation film 2 (shown by the arrow in this figure) is parallel to the absorption axis direction of the lower polarizer sheet 1 (shown by the arrow in this figure), and the slow axis direction of the second biaxial compensation film 6 (shown by the arrow in this figure) is orthogonal to the absorption axis direction of the upper polarizer sheet 7.

Figure 8:
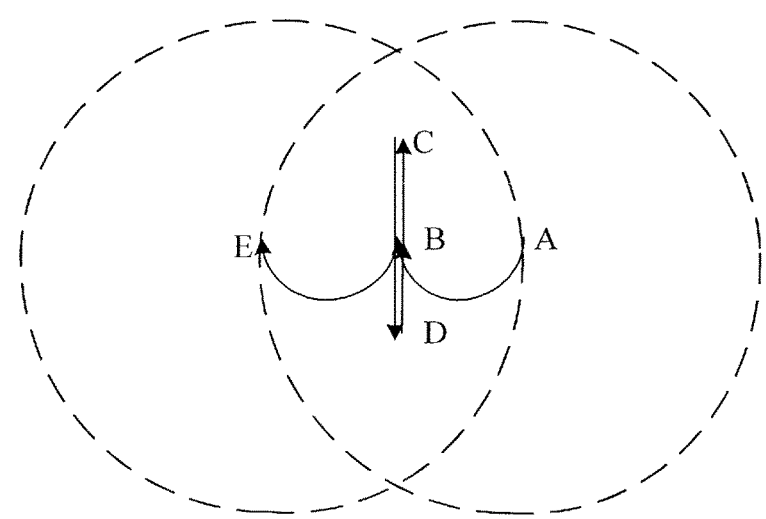
FIG. 8 is a compensation projection view on a Poincare sphere of the embodiment 4.

FIG. 8 is a compensation projection view on a Poincare sphere of the embodiment 3. The compensation principle is described as follows with reference to FIGS. 7 and 8. When light transmits through the lower polarizer sheet 1, the polarization state is at point A, and the position of the absorption axis of the upper polarizer sheet is at point E, thus it's necessary for the polarization state to be shifted from point A to point E; when the light passes through the first biaxial compensation film 2 of Nz=0.25, according to phase differential $\Gamma=2\pi\delta nd/\lambda$, and the retardation of the first biaxial compensation film 2 is $\delta nd=(nx-ny) d=\lambda/2$, thus the phase differential is $\pi$, and further, due to the slow axis direction of the first biaxial compensation film 2 of Nz=0.25 is parallel to the absorption axis direction of the lower polarizer sheet 1, the polarization state is shifted from point A to point B by a clockwise rotation of 180° around Nz=0.25; when the light passes through the liquid crystal cell 4, the liquid crystal retardation at the angle of oblique view causes the retardation of the polarization state from point B to point C; when the light passes through the first monoaxial compensation film 3, the polarization state shifts to point D; next, the polarization state return to point B from point D when the light passes further through the second monoaxial compensation film 5; thereafter, the polarization state is shifted from point B to point E by a clockwise rotation of 180° when the light is subject to the second biaxial compensation film 6 of Nz=0.75, and here compensation is achieved.

In the technical solutions of the present embodiment, by providing a biaxial compensation film at each side of the liquid crystal cell and providing monoaxial compensation films at both sides of the liquid crystal cell, the light leakage problem in a dark-state of the liquid crystal display is effectively overcome, and the viewing angle of the liquid crystal display is expanded.

Embodiment 5

Figure 9:
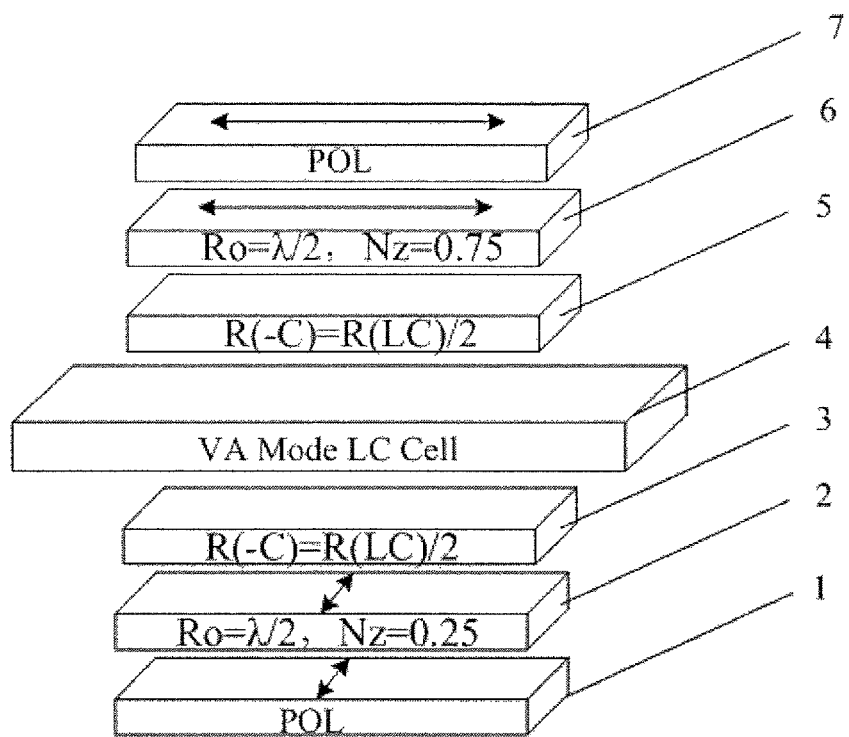
FIG. 9 is a structural schematic view of the liquid crystal display provided with viewing angle compensation according to embodiment 5 of the present invention.

As shown in FIG. 9, the liquid crystal display of this embodiment is substantially the same as that of embodiment 1 in structure, the difference is that, the slow axis direction of the first biaxial compensation film 2 (shown by the arrow in this figure) is parallel to the absorption axis direction of the lower polarizer sheet 1 (shown by the arrow in this figure).

Figure 10:
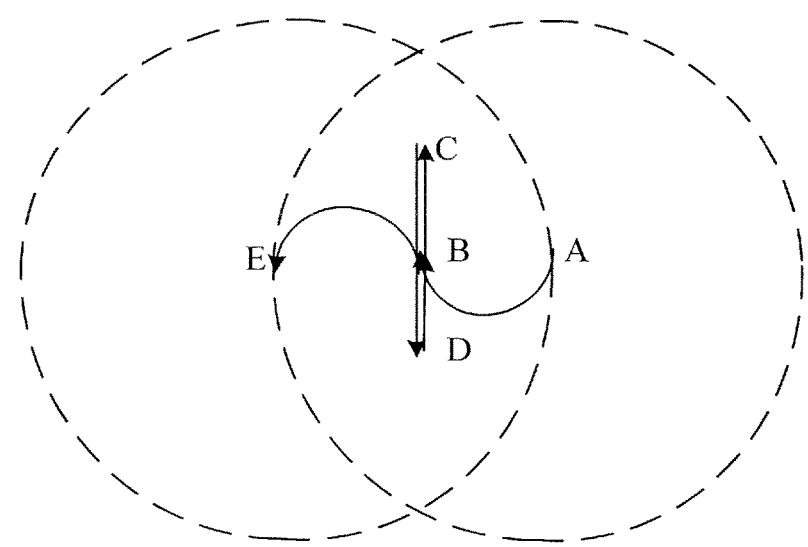
FIG. 10 is a compensation projection view on a Poincare sphere of the embodiment 5.

FIG. 10 is a compensation projection view on a Poincare sphere of the embodiment of the present invention. The compensation principle is described as follows with reference to FIGS. 9 and 10. When light transmits through the lower polarizer sheet 1, the polarization state is at point A, and the position of the absorption axis of the upper polarizer sheet is at point E, thus it's necessary for the polarization state to be shifted from point A to point E; when the light passes through the first biaxial compensation film 2 of Nz=0.25, according to phase differential $\Gamma=2\pi\delta nd/\lambda$, and the retardation of the first biaxial compensation film 2 is $\delta nd=(nx-ny)d=\lambda/2$, thus the phase differential is $\pi$, and further, due to the slow axis direction of the first biaxial compensation film 2 of Nz=0.25 is parallel to the absorption axis direction of the lower polarizer sheet 1, the polarization state is shifted from point A to point B by a clockwise rotation of 180° around Nz=0.25; when the light passes through the first monoaxial compensation film 3, the polarization state occurs retardation from point B to point C; when the light passes through the liquid crystal cell 4, the liquid crystal retardation at the angle of oblique view causes the polarization state shift to point D; then, the polarization state comes back to point B from point D when the light passes further through the second monoaxial compensation film 5; thereafter, the polarization state is shifted from point B to point E by a counterclockwise rotation of by 180° when the light is subject to the second biaxial compensation film 6 of Nz=0.75, and here compensation is achieved.

In the technical solutions of the present embodiment, by providing a biaxial compensation film at each side of the liquid crystal cell and providing monoaxial compensation films at both sides of the liquid crystal cell, the light leakage problem in a dark-state of the liquid crystal display is effectively overcome, and the viewing angle of the liquid crystal display is expanded.

Embodiment 6

Figure 11:
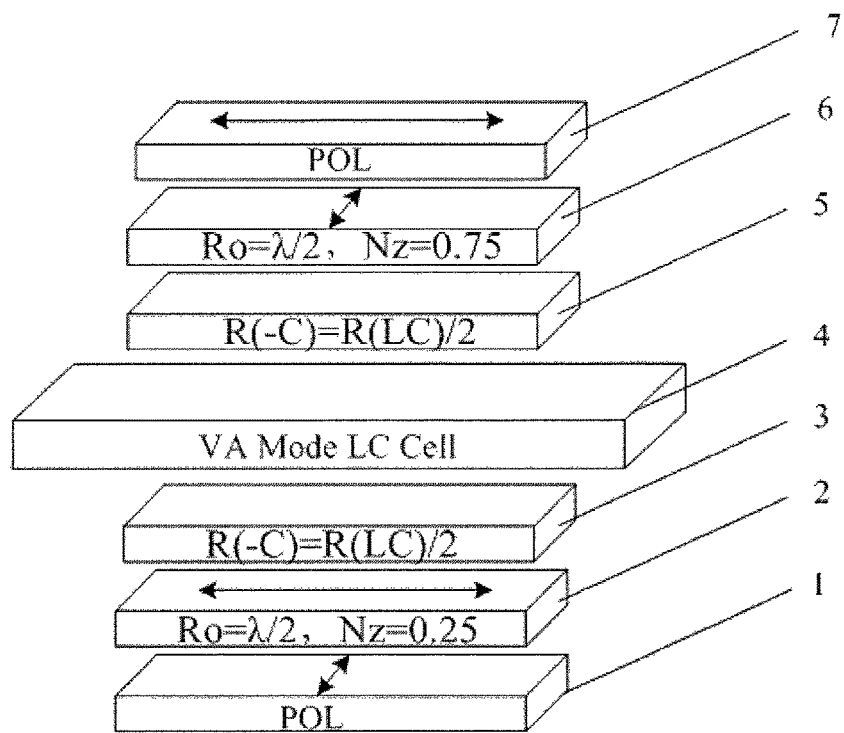
FIG. 11 is a structural schematic view of the liquid crystal display provided with viewing angle compensation according to embodiment 6 of the present invention.

As shown in FIG. 11, the liquid crystal display of this embodiment is substantially the same as that of embodiment 1 in structure, the difference is that, the slow axis direction of the second biaxial compensation film 6 (shown by the arrow in this figure) is orthogonal to the absorption axis direction of the upper polarizer sheet 7 (shown by the arrow in this figure).

Figure 12:
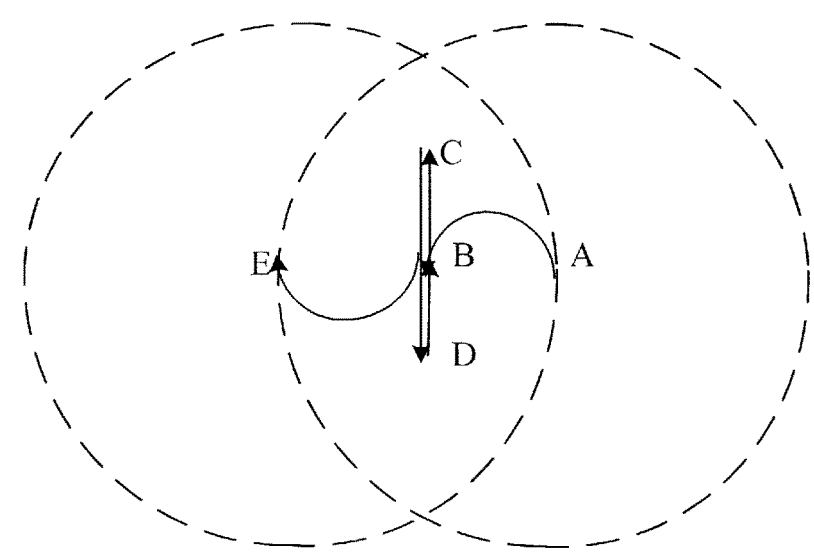
FIG. 12 is a compensation projection view on a Poincare sphere of the embodiment 6.

FIG. 12 is a compensation projection view on a Poincare sphere of the embodiment 3. The compensation principle is described as follows with reference to FIGS. 11 and 12. When light transmits through the lower polarizer sheet 1, the polarization state is at point A, and the position of the absorption axis of the upper polarizer sheet is at point E, thus it's necessary for the polarization state to be shifted from point A to point E; when the light passes through the first biaxial compensation film 2 of Nz=0.25, according to phase differential $\Gamma=2\pi\delta nd/\lambda$, and the retardation of the first biaxial compensation film 2 is $\delta nd=(nx-ny)d=\lambda/2$, thus the phase differential is $\pi$, and further, due to the slow axis direction of the first biaxial compensation film 2 of Nz=0.25 is parallel to the absorption axis direction of the lower polarizer sheet 1, the polarization state is shifted from point A to point B by a counterclockwise rotation of 180° around Nz=0.25; when the light passes through the first monoaxial compensation film 3, the polarization state occurs retardation from point B to point C; when the light passes through the liquid crystal cell 4, the liquid crystal retardation at the angle of oblique view causes the polarization state shift to point D; then, the polarization state comes back to point B from point D when the light passes further through the second monoaxial compensation film 5; the polarization state is rotated from point B to point E by a clockwise rotation of 180° when the light is subject to the second biaxial compensation film 6 of Nz=0.75, and here compensation is achieved.

In the technical solutions of the present embodiment, by providing a biaxial compensation film at each side of the liquid crystal cell and providing monoaxial compensation films at both sides of the liquid crystal cell, the light leakage problem in a dark-state of the liquid crystal display is effectively overcome, and the viewing angle of the liquid crystal display is expanded.

Embodiment 7

Figure 13:
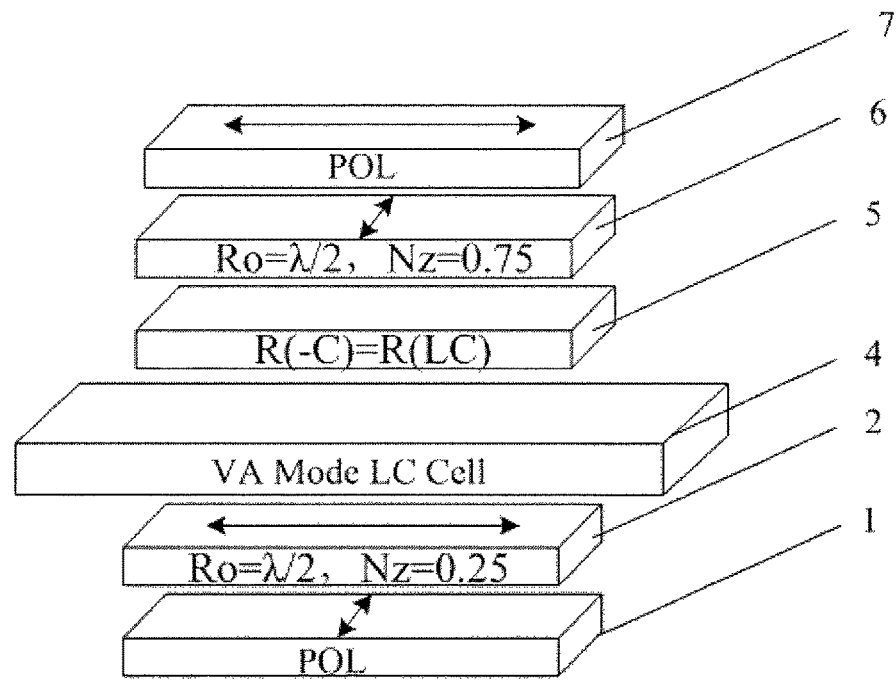
FIG. 13 is a structural schematic view of the liquid crystal display provided with viewing angle compensation according to embodiment 7 of the present invention.

As shown in FIG. 13, the liquid crystal display of this embodiment is substantially the same as that of embodiment 1 in structure, the difference is that a layer of monoaxial compensation film is provided only between the second biaxial compensation film 6 and the liquid crystal cell 4, that is, a second monoaxial compensation film 5, and the retardation R(−C) of the monoaxial compensation film is equal to the liquid crystal retardation R(LC) in a dark-state of the liquid crystal cell 4, that is, R(−C)=R(LC). The slow axis direction of the second biaxial compensation film 6 (shown by the arrow in this figure) is orthogonal to the absorption axis direction of the upper polarizer sheet 7 (shown by the arrow in this figure).

Figure 14:
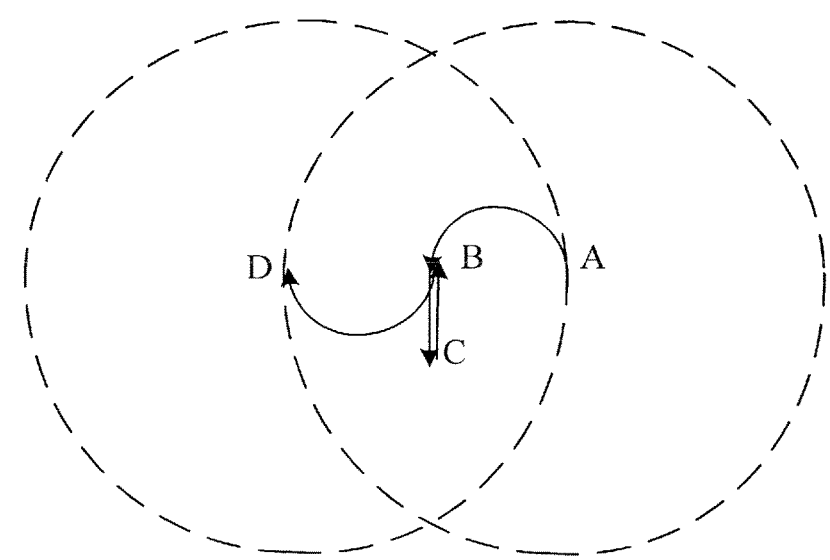
FIG. 14 is a compensation projection view on a Poincare sphere of the embodiment 7.

FIG. 14 is a compensation projection view on a Poincare sphere of the embodiment of the present invention. The compensation principle is described as follows with reference to FIGS. 13 and 14. When light transmits through the lower polarizer sheet 1, the polarization state is at the A point, and the position of the absorption axis of the upper polarizer sheet is at the Point D, thus it's necessary for the polarization state to be shifted from A point to Point D; when the light passes through the first biaxial compensation film 2 of Nz=0.25, according to phase differential $\Gamma=2\pi\delta nd/\lambda$, the phase differential is $\pi$ since the retardation $\delta nd=(nx-ny)d=\lambda/2$ of the first biaxial compensation film 2, and the polarization state is shifted from point A to point B by a counterclockwise rotation of 180° around Nz=0.25; when the light passes through the liquid crystal cell 4, the liquid crystal retardation at the angle of oblique view causes the retardation of the polarization state from point B to point C; when the light passes through the first monoaxial compensation film 3, the polarization state shifts back to point D; afterwards, the polarization state is rotated from point B to point D by a clockwise rotation of 180° when the light is subject to the second biaxial compensation film 6 of Nz=0.75, and here compensation is achieved.

In the technical solutions of the present embodiment, by providing a biaxial compensation film at each side of the liquid crystal cell and providing a monoaxial compensation film at the upside of the liquid crystal cell, the light leakage problem in a dark-state of the liquid crystal display is effectively overcome, and the viewing angle of the liquid crystal display is expanded.

Embodiment 8

Figure 15:
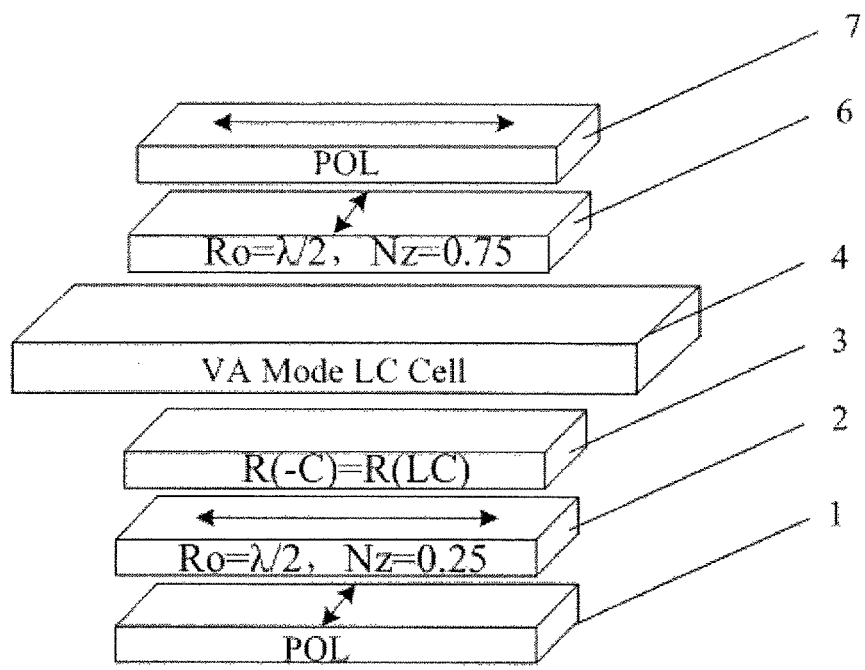
FIG. 15 is a structural schematic view of the liquid crystal display provided with viewing angle compensation according to embodiment 8 of the present invention.

As shown in FIG. 15, the liquid crystal display of this embodiment is substantially the same as that of embodiment 1 in structure, the difference is that a layer of monoaxial compensation film is provided only between the first biaxial compensation film 2 and the liquid crystal cell 4, that is, a first monoaxial compensation film 3, and the retardation R(−C) of the monoaxial compensation film is equal to the retardation R(LC) of liquid crystal when liquid crystal cell 4 is in the dark-state, that is, R(−C)=R(LC); the slow axis direction of the second biaxial compensation film 6 (shown by the arrow in this figure) is orthogonal to the absorption axis direction of the upper polarizer sheet 7 (shown by the arrow in this figure).

Figure 16:
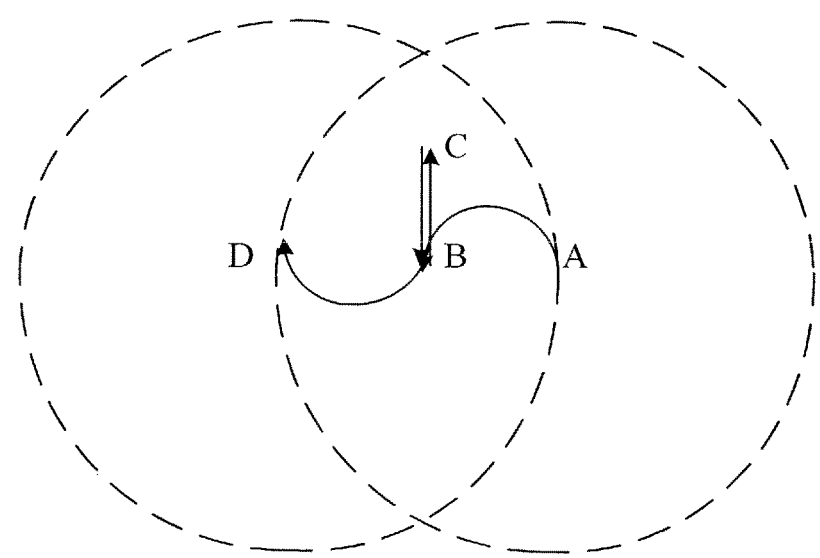
FIG. 16 is a compensation projection view on a Poincare sphere of the embodiment 8.

FIG. 16 is a compensation projection view on a Poincare sphere of the embodiment of the present invention. The compensation principle is described as follows with reference to FIGS. 15 and 16. When light transmits through the lower polarizer sheet 1, the polarization state is at the A point, and the position of the absorption axis of the upper polarizer sheet is at the Point D, thus it's necessary for the polarization state to be shifted from A point to Point D; when the light passes through the first biaxial compensation film 2 of Nz=0.25, according to phase differential $\Gamma=2\pi\delta nd/\lambda$, the phase differential is $\pi$ since the retardation $\delta nd=(nx-ny)d=\lambda/2$ of the first biaxial compensation film 2, and the polarization state is shifted from point A to point B by a counterclockwise rotation of 180° around Nz=0.25; when the light passes through the first monoaxial compensation film 3, the polarization state occurs retardation from point B to point C; when the light passes through the liquid crystal cell 4, the liquid crystal retardation at the angle of oblique view makes the polarization state return to point B; afterwards, the polarization state is rotated from point B to point D by a clockwise rotation of 180° when the light is subject to the second biaxial compensation film 6 of Nz=0.75, and here compensation is achieved.

In the technical solutions of the present embodiment, by providing a biaxial compensation film at each side of the liquid crystal cell and providing a monoaxial compensation film at the underside of the liquid crystal cell, the light leakage problem in a dark-state of the liquid crystal display is effectively overcome, and the viewing angle of the liquid crystal display is expanded.

Embodiment 9

Figure 17:
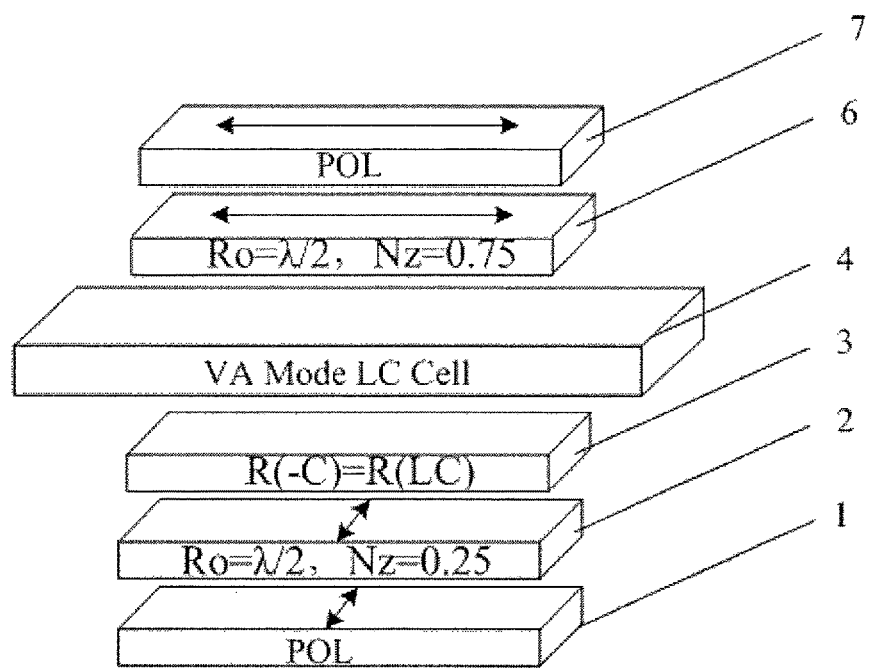
FIG. 17 is a structural schematic view of the liquid crystal display provided with viewing angle compensation according to embodiment 9 of the present invention.

As shown in FIG. 17, the liquid crystal display of this embodiment is substantially the same as that of embodiment 1 in structure, the difference is that a layer of monoaxial compensation film is provided only between the first biaxial compensation film 2 and the liquid crystal cell 4, that is, a first monoaxial compensation film 3, and the retardation R(−C) of the monoaxial compensation film is equal to the retardation R(LC) of liquid crystal when liquid crystal cell 4 is in the dark-state, that is, R(−C)=R(LC). The slow axis direction of the first biaxial compensation film 2 (shown by the arrow in this figure) is parallel to the absorption axis direction of the lower polarizer sheet 1 (shown by the arrow in this figure).

Figure 18:
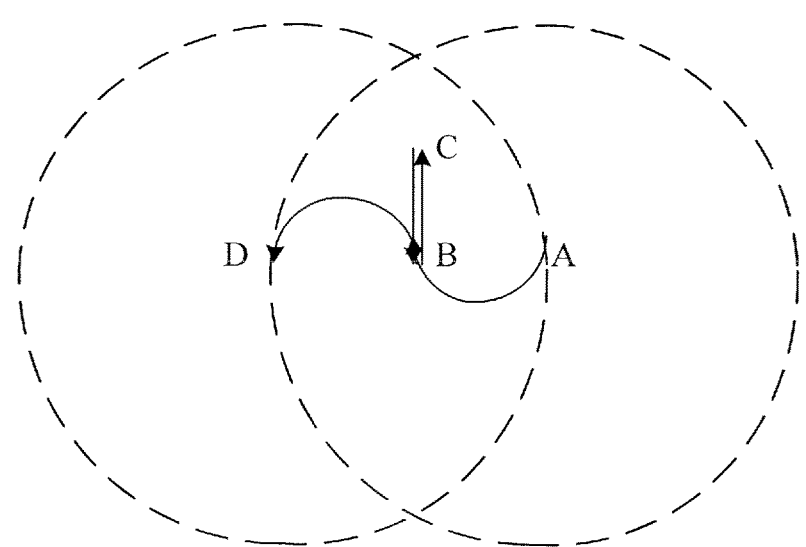
FIG. 18 is a compensation projection view on a Poincare sphere of the embodiment 9.

FIG. 18 is a compensation projection view on a Poincare sphere of the embodiment of the present invention. The compensation principle is described as follows with reference to FIGS. 17 and 18. When light transmits through the lower polarizer sheet 1, the polarization state is at the A point, and the position of the absorption axis of the upper polarizer sheet is at the Point D, thus it's necessary for the polarization state to be shifted from A point to Point D; when the light passes through the biaxial compensation film of Nz=0.25, according to phase differential $\Gamma=2\pi\delta nd/\lambda$, the phase differential is $\pi$ since the retardation $\delta nd=(nx-ny)d=\lambda/2$ of the first biaxial compensation film 2, and the polarization state is shifted from point A to point B by a clockwise rotation of 180° around Nz=0.25; when the light passes through the first monoaxial compensation film 3, the polarization state occurs retardation from point B to point C; afterwards, when the light passes through the liquid crystal cell 4, the liquid crystal retardation at the angle of oblique view makes the polarization state return to point B; then, the polarization state is rotated from point B to point D by a counterclockwise rotation of 180° when the light is subject to the second biaxial compensation film 6 of Nz=0.75, and here compensation is achieved.

In the technical solutions of the present embodiment, by providing a biaxial compensation film at each side of the liquid crystal cell and providing a monoaxial compensation film at the underside of the liquid crystal cell, the light leakage problem in a dark-state of the liquid crystal display is effectively overcome, and the viewing angle of the liquid crystal display is expanded.

Embodiment 10

Figure 19:
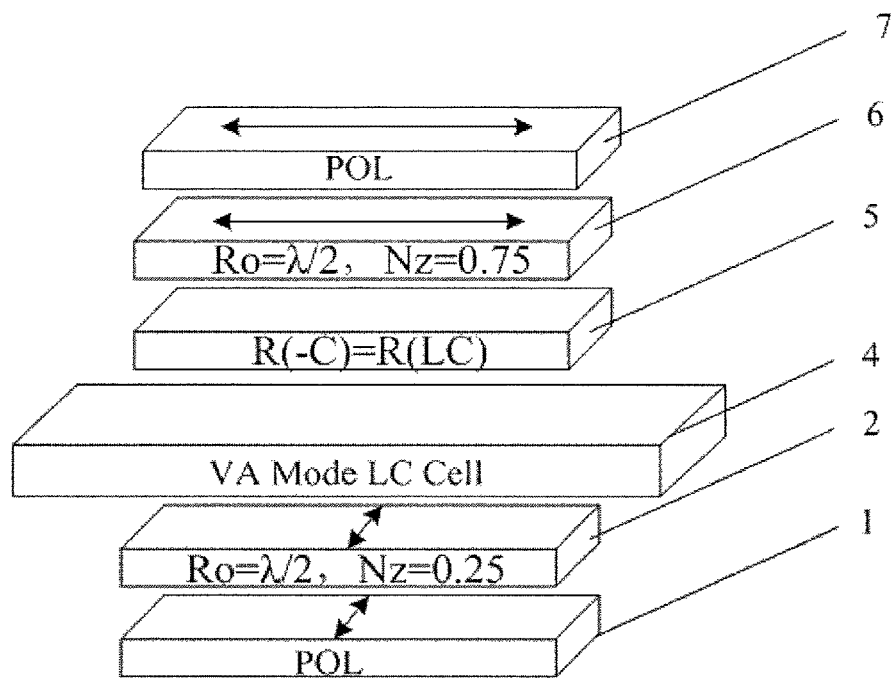
FIG. 19 is a structural schematic view of the liquid crystal display provided with viewing angle compensation according to embodiment 10 of the present invention.

As shown in FIG. 19, the liquid crystal display of this embodiment is substantially the same as that of embodiment 1 in structure, the difference is that a layer of monoaxial compensation film is provided only between the second biaxial compensation film 6 and the liquid crystal cell 4, that is, a second monoaxial compensation film 5, and the retardation R(−C) of the monoaxial compensation film is equal to the retardation R(LC) of liquid crystal when liquid crystal cell 4 is in the dark-state, that is, R(−C)=R(LC); and the slow axis direction of the first biaxial compensation film 2 (shown by the arrow in this figure) is parallel to the absorption axis direction of the lower polarizer sheet 1 (shown by the arrow in this figure).

Figure 20:
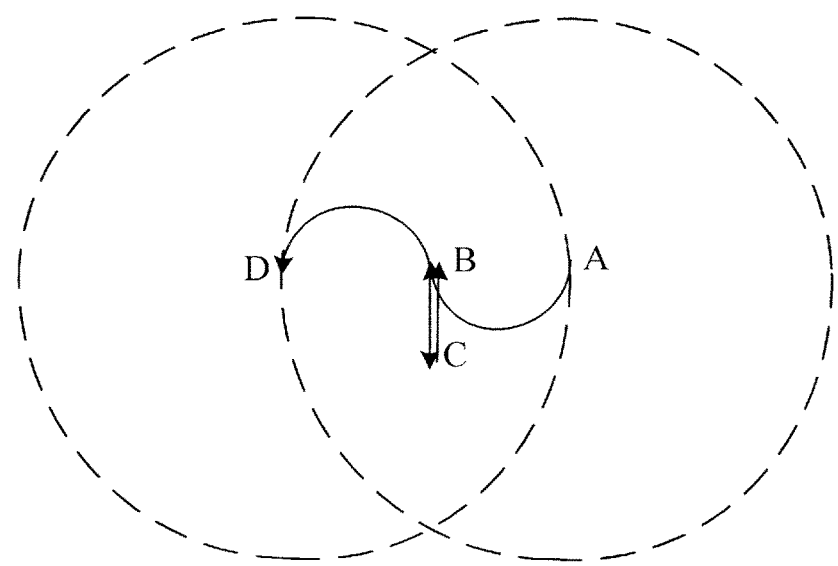
FIG. 20 is a compensation projection view on a Poincare sphere of the embodiment 10.

FIG. 20 is a compensation projection view on a Poincare sphere of the embodiment of the present invention. The compensation principle is described as follows with reference to FIGS. 19 and 20. When light transmits through the lower polarizer sheet I, the polarization state is at the A point, and the position of the absorption axis of the upper polarizer sheet is at the Point D, thus it's necessary for the polarization state to be shifted from A point to Point D; when the light passes through the biaxial compensation film of Nz=0.25, according to phase differential $\Gamma=2\pi\delta nd/\lambda$, the phase differential is $\pi$ since the retardation $\delta nd=(nx-ny)d=\lambda/2$ of the first biaxial compensation film 2, and the polarization state is shifted from point A to point B by a clockwise rotation of 180° around Nz=0.25; when the light passes through the liquid crystal cell 4, the liquid crystal retardation at the angle of oblique view causes the retardation of the polarization state from point B to point C; then, the polarization state comes back to point B when the light passes through the second monoaxial compensation film 5; the polarization state is rotated from point B to point D by a counterclockwise rotation of 180° when the light is subject to the second biaxial compensation film 6 of Nz=0.75, and here compensation is achieved.

In the technical solutions of the present embodiment, by providing a biaxial compensation film at each side of the liquid crystal cell and providing a monoaxial compensation film at the upside of the liquid crystal cell, the light leakage problem in a dark-state of the liquid crystal display is effectively overcome, and the viewing angle of the liquid crystal display is expanded.

Embodiment 11

Figure 21:
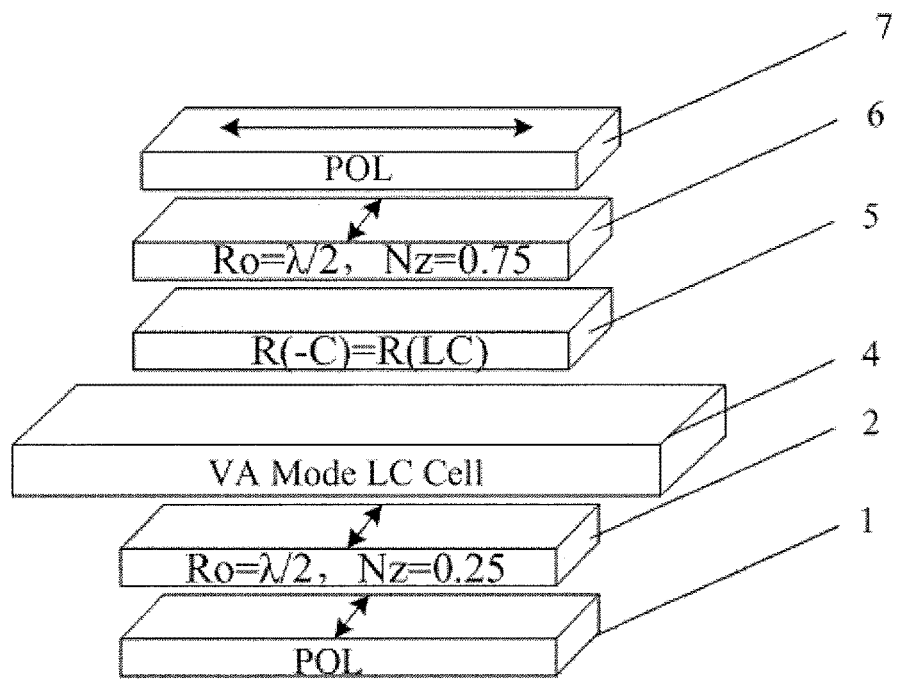
FIG. 21 is a structural schematic view of the liquid crystal display provided with viewing angle compensation according to embodiment 11 of the present invention.

As shown in FIG. 21, the liquid crystal display of this embodiment is substantially the same as that of embodiment 1 in structure, the difference is that a layer of monoaxial compensation film is provided only between the second biaxial compensation film 6 and the liquid crystal cell 4, that is, a second monoaxial compensation film 5, and the retardation R(−C) of the monoaxial compensation film is equal to the retardation R(LC) of liquid crystal when liquid crystal cell 4 is in the dark-state, that is, R(−C)=R(LC); and the slow axis direction of the first biaxial compensation film 2 (shown by the arrow in this figure) is parallel to the absorption axis direction of the lower polarizer sheet 1 (shown by the arrow in this figure), the slow axis direction of the second biaxial compensation film 6 (shown by the arrow in this figure) is orthogonal to the absorption axis direction of the upper polarizer sheet 7.

Figure 22:
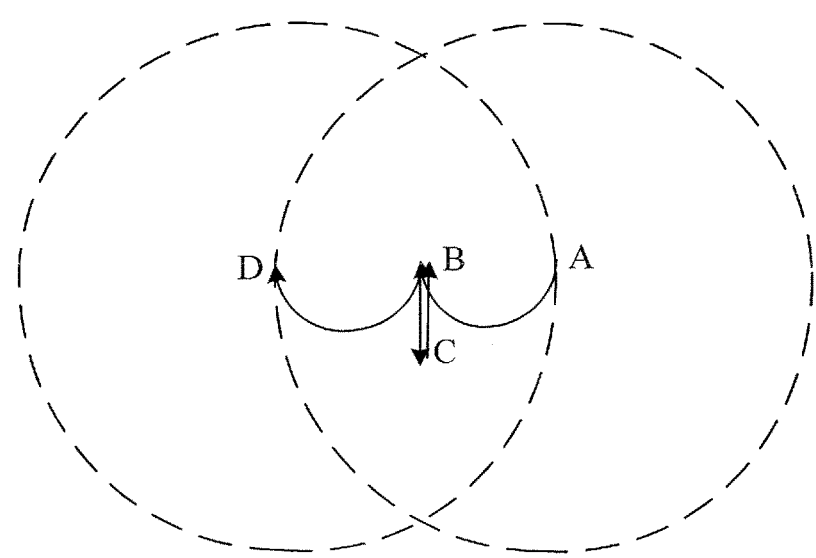
FIG. 22 is a compensation projection view on a Poincare sphere of the embodiment 11.

FIG. 22 is a compensation projection view on a Poincare sphere of the embodiment of present invention. The compensation principle is described as follows with reference to FIGS. 21 and 22. When light transmits through the lower polarizer sheet 1, the polarization state is at the A point, and the position of the absorption axis of the upper polarizer sheet is at the Point D, thus it's necessary for the polarization state to be shifted from A point to Point D; when the light passes through the biaxial compensation film of Nz=0.25, according to phase differential $\Gamma=2\pi\delta nd/\lambda$, the phase differential is $\pi$ since the retardation $\delta nd=(nx-ny)d=\lambda/2$ of the first biaxial compensation film 2, and the polarization state is shifted from point A to point B by a clockwise rotation of 180° around Nz=0.25; when the light passes through the liquid crystal cell 4, the liquid crystal retardation at the angle of oblique view causes the retardation of the polarization state from point B to point C; the polarization state comes back to point B when the light passes through the second monoaxial compensation film 5; thereafter, the polarization state is shifted from point B to point D by a clockwise rotation of 180° when the light is subject to the second biaxial compensation film 6 of Nz=0.75, and here compensation is achieved.

In the technical solutions of the present embodiment, by providing a biaxial compensation film at each side of the liquid crystal cell and providing a monoaxial compensation film at the upside of the liquid crystal cell, the light leakage problem in a dark-state of the liquid crystal display is effectively overcome, and the viewing angle of the liquid crystal display is expanded.

Embodiment 12

Figure 23:
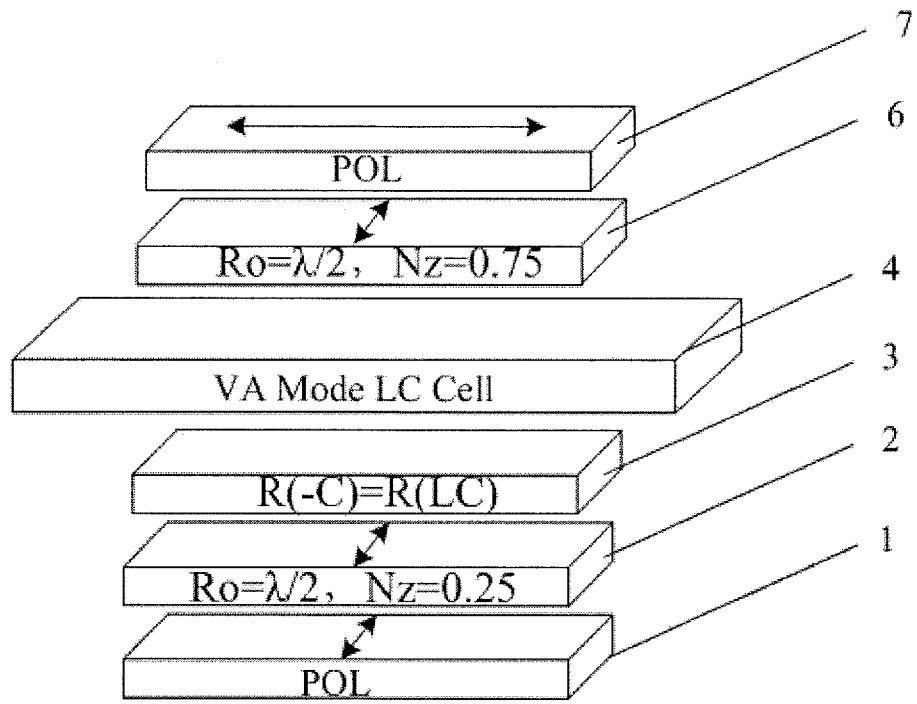
FIG. 23 is a structural schematic view of the liquid crystal display provided with viewing angle compensation according to embodiment 12 of the present invention.

As shown in FIG. 23, the liquid crystal display of this embodiment is substantially the same as that of embodiment 1 in structure, the difference is that a layer of monoaxial compensation film is provided only between the first biaxial compensation film 2 and the liquid crystal cell 4, that is, a first monoaxial compensation film 3, and the retardation R(−C) of the monoaxial compensation film is equal to the retardation R(LC) of liquid crystal when liquid crystal cell 4 is in the dark-state, that is, R(−C)=R(LC); and the slow axis direction of the first biaxial compensation film 2 (shown by the arrow in this figure) is parallel to the absorption axis direction of the lower polarizer sheet 1 (shown by the arrow in this figure), the slow axis direction of the second biaxial compensation film 6 (shown by the arrow in this figure) is orthogonal to the absorption axis direction of the upper polarizer sheet 7.

Figure 24:
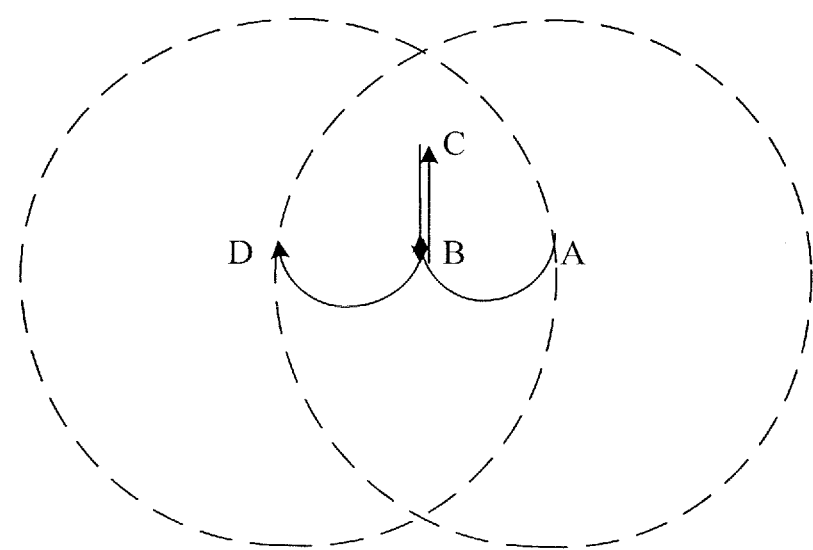
FIG. 24 is a compensation projection view on a Poincare sphere of the embodiment 12.

FIG. 24 is a compensation projection view on a Poincare sphere of the embodiment of present invention. The compensation principle is described as follows with reference to FIGS. 23 and 24. When light transmits through the lower polarizer sheet 1, the polarization state is at the A point, and the position of the absorption axis of the upper polarizer sheet is at the Point D, thus it's necessary for the polarization state to be shifted from A point to Point D; when the light passes through the first biaxial compensation film 2 of Nz=0.25, according to phase differential $\Gamma=2\pi\delta nd/\lambda$, the phase differential is $\pi$ since the retardation $\delta nd=(nx-ny)d=\lambda/2$ of the first biaxial compensation film 2, and the polarization state is shifted from point A to point B by a counterclockwise rotation of 180° around Nz 0.25; when the light passes through the second monoaxial compensation film 5, the polarization state occurs retardation from point B to point C; when the light passes through the liquid crystal cell 4, the liquid crystal retardation at the angle of oblique view makes the polarization state return to point B; the polarization state is rotated from point B to point D by a counterclockwise rotation of 180° when the light is subject to the second biaxial compensation film 6 of Nz=0.75, and here compensation is achieved.

In the technical solutions of the present embodiment, by providing a biaxial compensation film at each side of the liquid crystal cell and providing a monoaxial compensation film at the underside of the liquid crystal cell, the light leakage problem in a dark-state of the liquid crystal display is effectively overcome, and the viewing angle of the liquid crystal display is expanded.

The above described are merely specific embodiments of the present invent, but the protective scope of the invention is not limited thereto. The protection scope of the present invention should be in accordance with the protection scope of the claims.

The invention claimed is:

1. A liquid crystal display provided with viewing angle compensation, comprising:
   a liquid crystal cell in a vertical alignment mode;
   an upper polarizer sheet and a lower polarizer sheet, which are disposed on an upperside and an underside of the liquid crystal cell respectively;
   a first biaxial compensation film provided between the liquid crystal cell and the lower polarizer sheet;
   a second biaxial compensation film provided between the liquid crystal cell and the upper polarizer sheet; and
   a monoaxial compensation film provided at the upperside and/or underside of the liquid crystal cell, wherein retardation of the monoaxial compensation film as a whole is equal to liquid crystal retardation of the liquid crystal cell in a dark-state;
   retardation of the first biaxial compensation film is Ro=(nx−ny)×d=λ/2, and an aspect ratio value of the first biaxial compensation film is Nz=(nx−nz)/(nx−ny)=0.25;
   retardation of the second biaxial compensation film is Ro=(nx−ny)×d=λ/2, and an aspect ratio value of the second biaxial compensation film is Nz=(nx−nz)/(nx−ny)=0.75;
   wherein nx is a refractive index in an X-axis direction of the first and second biaxial compensation films; ray is a refractive index in a Y-axis direction of the first and second biaxial compensation films; nz is a refractive index in a thickness direction of the first and second biaxial compensation films; λ is wavelength, d is a thickness of the first and second biaxial compensation films;
   the monoaxial compensation film comprises a first monoaxial compensation film provided between the liquid crystal cell and the first biaxial compensation film and a second monoaxial compensation film provided between the liquid crystal cell and the second biaxial compensation film;
   retardation of each of the first and second monoaxial compensation films is equal to half of liquid crystal retardation of the liquid crystal cell in a dark-state; and a slow axis of the first biaxial compensation film is orthogonal to an absorption axis direction of the lower polarizer sheet, and a slow axis direction of the second biaxial compensation film is parallel to an absorption axis direction of the upper polarizer sheet; or a slow axis direction of the first biaxial compensation film is parallel to an absorption axis direction of the lower polarizer sheet, and a slow axis direction of the second biaxial compensation film is orthogonal to an absorption axis direction of the upper polarizer sheet;

or a slow axis direction of the first biaxial compensation film is parallel to an absorption axis direction of the lower polarizer sheet, and a slow axis direction of the second biaxial compensation film is parallel to an absorption axis direction of the upper polarizer sheet;

or a slow axis direction of the first biaxial compensation film is orthogonal to an absorption axis direction of the lower polarizer sheet, and a slow axis direction of the second biaxial compensation film is orthogonal to an absorption axis direction of the upper polarizer sheet;

a range for the liquid crystal retardation is 80 nm<R(LC)< 600 nm.

2. A liquid crystal display according to claim 1, wherein the slow axis of the first biaxial compensation film is orthogonal to the absorption axis direction of the lower polarizer sheet, and the slow axis direction of the second biaxial compensation film is parallel to the absorption axis direction of the upper polarizer sheet.

3. A liquid crystal display according to claim 1, wherein the slow axis direction of the first biaxial compensation film is parallel to the absorption axis direction of the lower polarizer sheet, and the &ow axis direction of the second biaxial compensation film is orthogonal to the absorption axis direction of the upper polarizer sheet.

4. A liquid crystal display according to claim 1, wherein the slow axis direction of the first biaxial compensation film is parallel to the absorption axis direction of the lower polarizer sheet, and the slow axis direction of the second biaxial compensation film is parallel to the absorption axis direction of the upper polarizer sheet.

5. A liquid crystal display according to claim 1, wherein the slow axis direction of the first biaxial compensation film is orthogonal to the absorption axis direction of the lower polarizer sheet, and the slow axis direction of the second biaxial compensation film is orthogonal to the absorption axis direction of the upper polarizer sheet.

6. A liquid crystal display provided with viewing angle compensation, comprising:

a liquid crystal cell in a vertical alignment mode;

an upper polarizer sheet and a lower polarizer sheet, which are disposed on an upperside and an underside of the liquid crystal cell respectively;

a first biaxial compensation film provided between the liquid crystal cell and the lower polarizer sheet;

a second biaxial compensation film provided between the liquid crystal cell and the upper polarizer sheet; and a monoaxial compensation film provided at the upperside and/or underside of the liquid crystal cell, wherein retardation of the monoaxial compensation film as a whole is equal to a liquid crystal retardation of the liquid crystal cell in a dark-state;

retardation of the first biaxial compensation film is Ro=(nx−ny)xd=λ/2, and an aspect ratio value of the first biaxial compensation film is Nz=(nx−nz)/(nx−ny)= 0.25;

retardation of the second biaxial compensation film is Ro=(nx−ny)xd=λ/2, and an aspect ratio value of the second biaxial compensation film is Nz=(nx−nz)/(nx−Ny)=0.75;

wherein nx is a refractive index in an X-axis direction of the first and second biaxial compensation films; ny is a refractive index in a Y-axis direction of the first and second biaxial compensation films; nz is a refractive index in a thickness direction of the first and second biaxial compensation films; λ is wavelength, d is a thickness of the first and second biaxial compensation films;

wherein the monoaxial compensation film comprises a first monoaxial compensation film provided between the liquid crystal cell and the first biaxial compensation film;

retardation of the first monoaxial compensation film is equal to liquid crystal retardation of the liquid crystal cell in a dark-state; and a slow axis of the first biaxial compensation film is orthogonal to an absorption axis direction of the lower polarizer sheet, and a slow axis direction of the second biaxial compensation film is parallel to an absorption axis direction of the upper polarizer sheet; or a slow axis direction of the first biaxial compensation film is orthogonal to an absorption axis direction of the lower polarizer sheet, and a slow axis direction of the second biaxial compensation film is orthogonal to an absorption axis direction of the upper polarizer sheet; or a slow axis direction of the first biaxial compensation film is parallel to an absorption axis direction of the lower polarizer sheet, and a slow axis direction of the second biaxial compensation film is orthogonal to an absorption axis direction of the upper polarizer sheet; or a slow axis direction of the first biaxial compensation film is parallel to an absorption axis direction of the lower polarizer sheet, and a slow axis direction of the second biaxial compensation film is parallel to an absorption axis direction of the upper polarizer sheet;

a range for the liquid crystal retardation is 80 nm<R(LC) <600 nm.

7. A liquid crystal display according to claim 6, wherein the slow axis of the first biaxial compensation film is orthogonal to the absorption axis direction of the lower polarizer sheet, and the slow axis direction of the second biaxial compensation film is parallel to the absorption axis direction of the upper polarizer sheet.

8. A liquid crystal display according to claim 6, wherein the slow axis direction of the first biaxial compensation film is orthogonal to the absorption axis direction of the lower polarizer sheet, and the slow axis direction of the second biaxial compensation film is orthogonal to the absorption axis direction of the upper polarizer sheet.

9. A liquid crystal display according to claim 6, wherein the slow axis direction of the first biaxial compensation film is parallel to the absorption axis direction of the lower polarizer sheet, and the slow axis direction of the second biaxial compensation film is orthogonal to the absorption axis direction of the upper polarizer sheet.

10. A liquid crystal display according to claim 6, wherein the slow axis direction of the first biaxial compensation film is parallel to the absorption axis direction of the lower polarizer sheet, and the slow axis direction of the second biaxial compensation film is parallel to the absorption axis direction of the upper polarizer sheet.

11. A liquid crystal display provided with viewing angle compensation, comprising:
  a liquid crystal cell in a vertical alignment mode;
  an upper polarizer sheet and a lower polarizer sheet, which are disposed on an upperside and an underside of the liquid crystal cell respectively;
  a first biaxial compensation film provided between the liquid crystal cell and the lower polarizer sheet;
  a second biaxial compensation film provided between the crystal cell and the upper polarizer sheet; and
  a monoaxial compensation film provided at the upperside and/or underside of the liquid crystal cell, wherein retardation of the monoaxial compensation film as a whole is equal to liquid crystal retardation of the liquid crystal cell in a dark-state;
  retardation of the first biaxial compensation film is $Ro=(nx-ny)\times d=\lambda/2$, and an aspect ratio value of the first biaxial compensation film is $Nz=(nx-nz)/(nx-ny)=0.25$;
  retardation of the second biaxial compensation film is $Ro=(nx-ny)\times d=\lambda/2$, and an aspect ratio value of the second biaxial compensation film is $Nz=(nx-nz)/(nx-ny)=0.75$;
  wherein nx is a refractive index in an X-axis direction of the first and second biaxial compensation films; ny is a refractive index in a Y-axis direction of the first and second biaxial compensation films; nz is a refractive index in a thickness direction of the first and second biaxial compensation films; $\lambda$ is wavelength, d is a thickness of the first and second biaxial compensation films;
  wherein the monoaxial compensation film comprises a second monoaxial compensation film provided between the liquid crystal cell and the second biaxial compensation film;
  retardation of the second monoaxial compensation film is equal to liquid crystal retardation of the liquid crystal cell in a dark-state:
  a slow axis of the first biaxial compensation film is orthogonal to an absorption axis direction of the lower polarizer sheet, and a slow axis direction of the second biaxial compensation film is parallel to an absorption axis direction of the upper polarizer sheet; or
  a slow axis direction of the first biaxial compensation film is orthogonal to an absorption axis direction of the lower polarizer sheet, and a slow axis direction of the second biaxial compensation film is orthogonal to an absorption axis direction of the upper polarizer sheet; or
  a slow axis direction of the first biaxial compensation film is parallel to an absorption axis direction of the lower polarizer sheet, and slow axis direction of the second biaxial compensation film is parallel to an absorption axis direction of the upper polarizer sheet; or
  a slow axis direction of the first biaxial compensation film is parallel to an absorption axis direction of the lower polarizer sheet, and a slow axis direction of the second biaxial compensation film is orthogonal to an absorption axis direction of the upper polarizer sheet;
  a range for the liquid crystal retardation is 80 nm<R(LC)<600 nm.

12. A liquid crystal display according to claim 11, wherein the slow axis of the first biaxial compensation film is orthogonal to the absorption axis direction of the lower polarizer sheet, and the slow axis direction of the second biaxial compensation film is parallel to the absorption axis direction of the upper polarizer sheet.

13. A liquid crystal display according to claim 11, wherein the slow axis direction of the first biaxial compensation film is orthogonal to the absorption axis direction of the lower polarizer sheet, and the slow axis direction of the second biaxial compensation film is orthogonal to the absorption axis direction of the upper polarizer sheet.

14. A liquid crystal display according to claim 11, wherein the slow axis direction of the first biaxial compensation film is parallel to the absorption axis direction of the lower polarizer sheet, and the slow axis direction of the second biaxial compensation film is parallel to the absorption axis direction of the upper polarizer sheet.

15. A liquid crystal display according to claim 11, wherein the slow axis direction of the first biaxial compensation film is parallel to the absorption axis direction of the lower polarizer sheet, and the slow axis direction of the second biaxial compensation film is orthogonal to the absorption axis direction of the upper polarizer sheet.

* * * * *